US 6,396,773 B1

(12) United States Patent
Kuo

(10) Patent No.: US 6,396,773 B1
(45) Date of Patent: May 28, 2002

(54) PHOTO SERVO PATTERNING ON MAGNETO-OPTICAL MEDIA

(75) Inventor: David S. Kuo, Palo Alto, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/209,902

(22) Filed: Dec. 11, 1998

Related U.S. Application Data

(60) Provisional application No. 60/068,146, filed on Dec. 12, 1997.

(51) Int. Cl.[7] ............................ G11B 11/00; G11B 5/127
(52) U.S. Cl. ..................................... 369/13.02; 360/313
(58) Field of Search ......................... 369/14, 13, 44.15, 369/44.16, 44.17, 275.3, 275.4, 13.17, 44.35, 44.29, 44.26, 13.02, 13.14; 360/135, 131, 313, 77.03

(56) References Cited

U.S. PATENT DOCUMENTS

| | | | |
|---|---|---|---|
| 5,295,122 A | * 3/1994 | Murakami et al. | 369/13.17 |
| 5,841,520 A | * 11/1998 | Taniguchi | 355/53 |
| 5,889,641 A | * 3/1999 | Belser et al. | 360/313 |
| 5,894,463 A | * 4/1999 | Okawa et al. | 396/44.35 |
| 6,014,296 A | * 1/2000 | Ichihara et al. | 360/135 |
| 6,055,139 A | * 4/2000 | Ohtsuka et al. | 360/131 |

* cited by examiner

Primary Examiner—Ali Neyzari
(74) Attorney, Agent, or Firm—Moser, Patterson & Sheridan, LLP

(57) ABSTRACT

The present invention relates to a rigid disc substrate for use in a magneto-optical drive, and two methods and apparatus to solve the above-mentioned problems.

A method for writing a servo pattern on a magneto-optical rigid media, after the media optical film is deposited. The method involves an image transfer process, wherein a light source provides an energy pulse to heat up the magneto-optical film above its compensation temperature. Light is directed onto the film through a photo mask which has a prewritten servo pattern on it. The image on the mask is transferred to the magneto-optic disc when an external field is applied by a magnetic field generating coil which defines the area illuminated by the source where the pattern is to be written.

In an alternative approach, the mask may be in contact with the media while the light exposure and magnetic field are applied.

In a further alternative, the image transfer is achieved with a scanning method whereby the light source is scanned through the mask with the aid of a scanning device while the external magnetic field is applied. This scanning method applies equally well with projection image transfer or contact image transfer.

14 Claims, 6 Drawing Sheets

PHOTO SERVO PATTERNING ON MAGNETO-OPTICAL MEDIA

This application claims priority from provisional application Ser. No. 60/068,146, filed Dec. 12, 1997.

FIELD OF THE INVENTION

The present invention relates generally to methods and apparatus for forming servo patterns, and more particularly to such methods and apparatus for forming servo patterns on glass discs for use on a magneto-optical disc drive.

BACKGROUND OF THE INVENTION

Traditional disc drives are storage information devices that use rotating thin film media to store data. A hard disc drive includes one or more rotatable discs each having closely spaced concentric data tracks. Each track is further subdivided into sectors wherein data is stored. As a disc rotates, a transducer (or head) is positioned by an actuator to read data from or write data to the various sectors within the tracks on the disc.

Prior to a disc drive's use in a computer, formatting information is written to disc surfaces in the drive. This formatting information can include, for example, the location of each data storage sector, sector number identification information, the start of a group of sectors, and servo pattern information. Disc formatting information enables essential drive operations and/or provides for improved disc drive operation or features. For example, as described below, servo pattern information which is essential to maintain a drive's head alignment with the tracks on the disc is stored on the disc.

To accurately read or write data to a disc, the drive's head or transducer must remain closely aligned with the particular track being accessed. If the head deviates from the track, data may be read or written improperly. This can result in irretrievable data and damage to existing stored data.

To maintain alignment between the head and track, a closed loop alignment system is used. A conventional head alignment systems, markers on one or more disc surfaces are used to guide the heads. These markers, known as servo patterns, provide dynamic head position feedback to a control mechanism. In response to detected servo pattern signals, the control mechanism can adjust head alignment while reading or writing data to the disc.

Servo patterns on a traditional magneto-optical disc with which this invention is especially concerned consists of a pre-embossed pattern array as is well understood in this technology and is described for example in "The Physical Principles of Magneto-Optical Recording" by Masud Mansuripur, Cambridge University Press 1995. These pits are made on a plastic substrate by an injection molding process with the aid of a master plate. Magneto-optical film is subsequently deposited over the servo pattern. While injection molding provides a low-cost manufacturing process for plastic substrates, it is not suitable for more rigid substrates, such as glass or ceramic substrates. Hence, creating servo patterns on a rigid substrate remains a challenge.

Geometry of the head in a conventional magneto-optical drive which employs remote optical pickup to read/write information does not impose a significant problem. But with a lens incorporated on a Winchester-type flying head, geometry of the system can affect the flyability of the head over the servo pattern.

Servo patterns on a magneto-optical disc could also be written magnetically with a servo writing process similar to that used to create servo patterns in a hard magnetic disc. This process involves bit-by-bit sequential writing, which takes a long time to complete. A disc may have many thousands of tracks; consequently, formatting the disc with servo patterns and/or other formatting information can be a time consuming process. Therefore, present methods and apparatus for writing servo patterns on a rigid substrate remains a problem and a need exists for a solution to this problem.

The present invention provides a solution to this and other problems, and offers other advantages over the prior art.

SUMMARY OF THE INVENTION

The present invention relates to a rigid disc substrate for use in a magneto-optical drive, and two methods and apparatus to solve the above-mentioned problems.

In accordance with one embodiment of the invention, a method is provided for writing a servo pattern on a magneto-optical rigid media, after the media optical film is deposited. The method involves an image transfer process, wherein a light source provides an energy pulse to heat up the magneto-optical film above its compensation temperature. Light is directed onto the film through a photo mask which has a prewritten servo pattern on it. The image on the mask is transferred to the magneto-optic disc when an external field is applied by a magnetic field generating coil which defines the area illuminated by the source where the pattern is to be written.

In an alternative approach, the mask is in contact with the media while the light exposure and magnetic field are applied.

In a further alternative, the image transfer is achieved with a scanning method whereby the light source is scanned through the mask with the aid of a scanning device while the external magnetic field is applied. This scanning method applies equally well with projection image transfer or contact image transfer. These and various other features as well as advantages which characterize the present invention will be apparent upon reading the following detailed description and review of the associated drawings.

DETAILED DESCRIPTION OF THE PREFERRED EMBODIMENT

Figure 1:
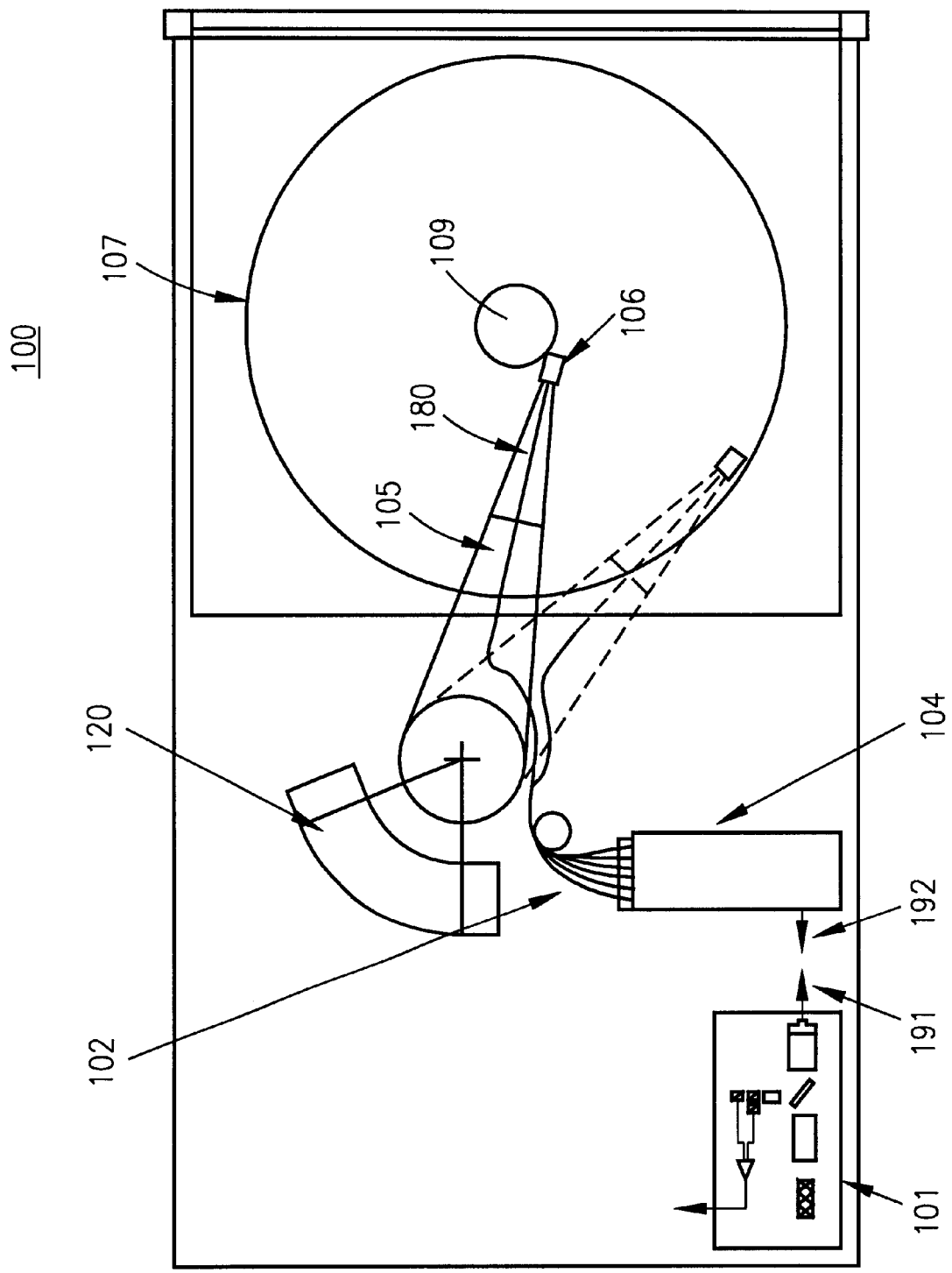
FIG. 1 is a top plan view of a magneto-optical disc drive in which the disc of the present invention would be useful.

Referring now in detail to the drawings, wherein similar parts of the invention are identified by like reference numerals, there is seen in FIG. 1 a plan view showing a typical magneto-optical data storage and retrieval system in which the present invention is useful. Of course, the slider disclosed and discussed below is not limited to use in such a magneto-optical storage system; indeed, the slider has utility in conventional magnetic disc drive storage systems, if properly scaled for the flying heights desired in such systems.

The embodiment of FIG. 1 shows a magneto-optical (MO) data storage and retrieval system 100 which includes a set of Winchester-type flying heads 106 that are adapted for use with a set of double sided MO discs 107. The set of flying heads 106 which are carried on the slider which is the subject of this invention are coupled to a rotary actuator magnet and coil assembly 120 by a suspension 130 and an actuator arm 105 to be positioned over the surfaces of the set of MO discs 107. In operation, the MO discs 107 are rotated by a spindle motor to generate aerodynamic lift forces between the sets of flying MO heads 106 and the disc surface, and to maintain the head in a flying condition above the upper and lower surfaces of the discs 107. The lift forces are opposed by equal and opposite spring forces applied by suspensions 130 as is well known in this technology. During non-operation, the MO heads are maintained statically in a storage condition away from the surfaces of the discs 107; they may rest in a landing zone at the ID of the disc surface, or on a ramp 131 which typically is at the OD of the disc surface.

System 100 further includes a laser optic assembly 101, an optical switch 104, and a set of single mode PM (polarization maintaining) optical fibers 102. In the exemplary embodiment, each of the set of single mode PM optical fibers 102 are coupled through a respective one of the set of actuator arms 105 and suspension 130 to a respective one of the set of flying MO heads 106.

Figure 2:
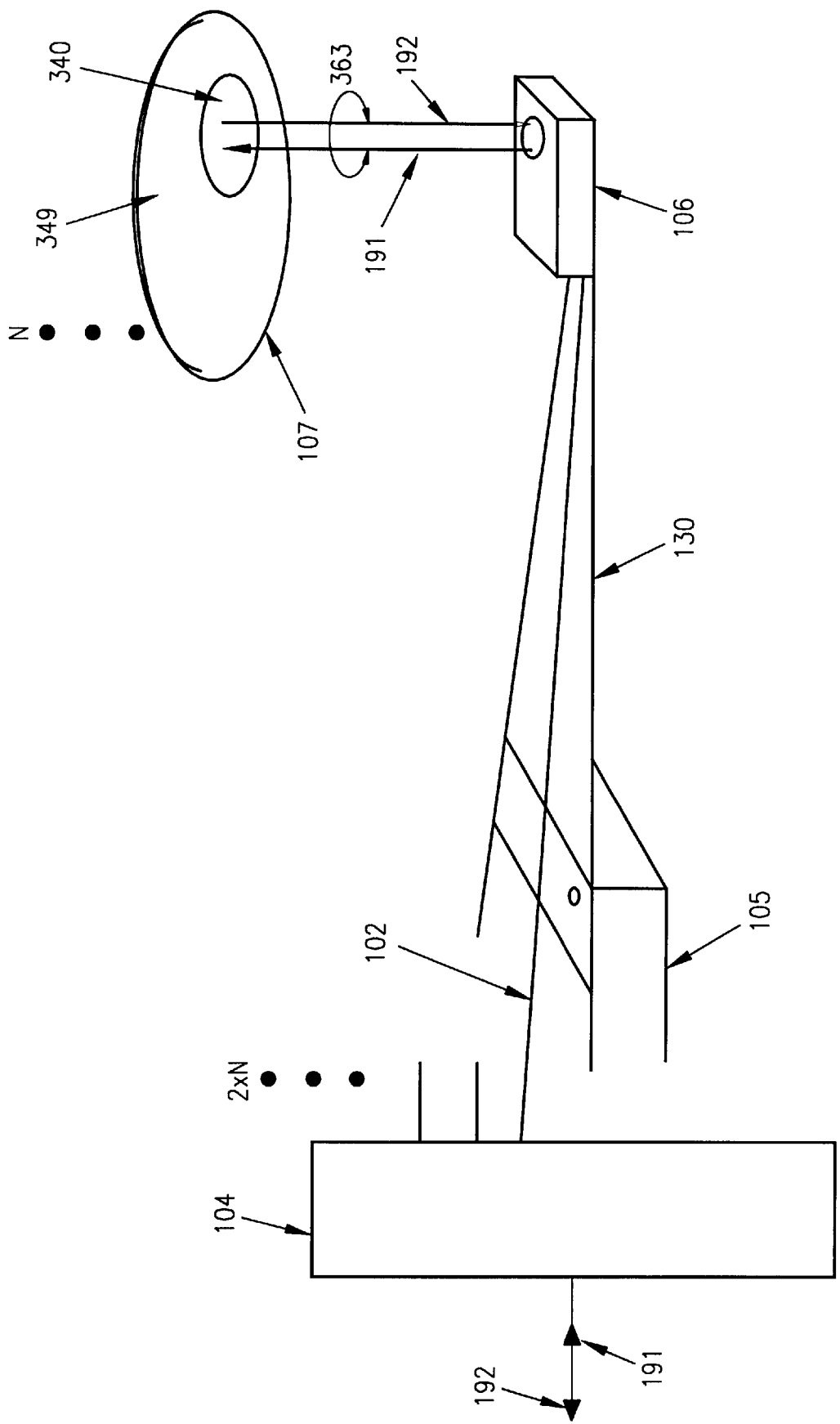
FIG. 2 is a diagrammatic view of certain major elements in the disc drive of FIG. 1, including the actuator and the disc.

FIG. 2 is a diagram showing in very simplified form a representative optical path utilizing a optical fiber 102 which is supported on the suspension 130 to reach one of the flying MO heads 106. An optical switch 104 provides for directing an outgoing laser beam 191 toward a respective proximal end of the PM optical fiber 102. The outgoing laser beam 191 is directed by the optical fiber 102 to exit at a respective distal end to pass through the flying MO head 106 onto a recording storage layer of a disc 107 associated with the flying head. Other details of the reading and writing operation associated with this optical fiber and optical switch may be found in an application entitled "MAXIMUM DATA STORAGE FOR MAGNETO-OPTICAL SYSTEM", U.S. Ser. No. 08/844,208 filed Apr. 18, 1997 assigned to the Assignee of the present invention. The above FIGS. 1 and 2 are provided to illustrate the importance of quickly moving the flying head 106 to a selected position over the surface of the associated disc 107 and maintaining that head at a stable position relative to a selected track on the surface of the disc while information is written to and read from the surface of the disc. The use of the method and apparatus disclosed herein for defining servo tracks on the surface of a disc is clearly not limited to any single configuration of head, arm and disc.

Figure 3:
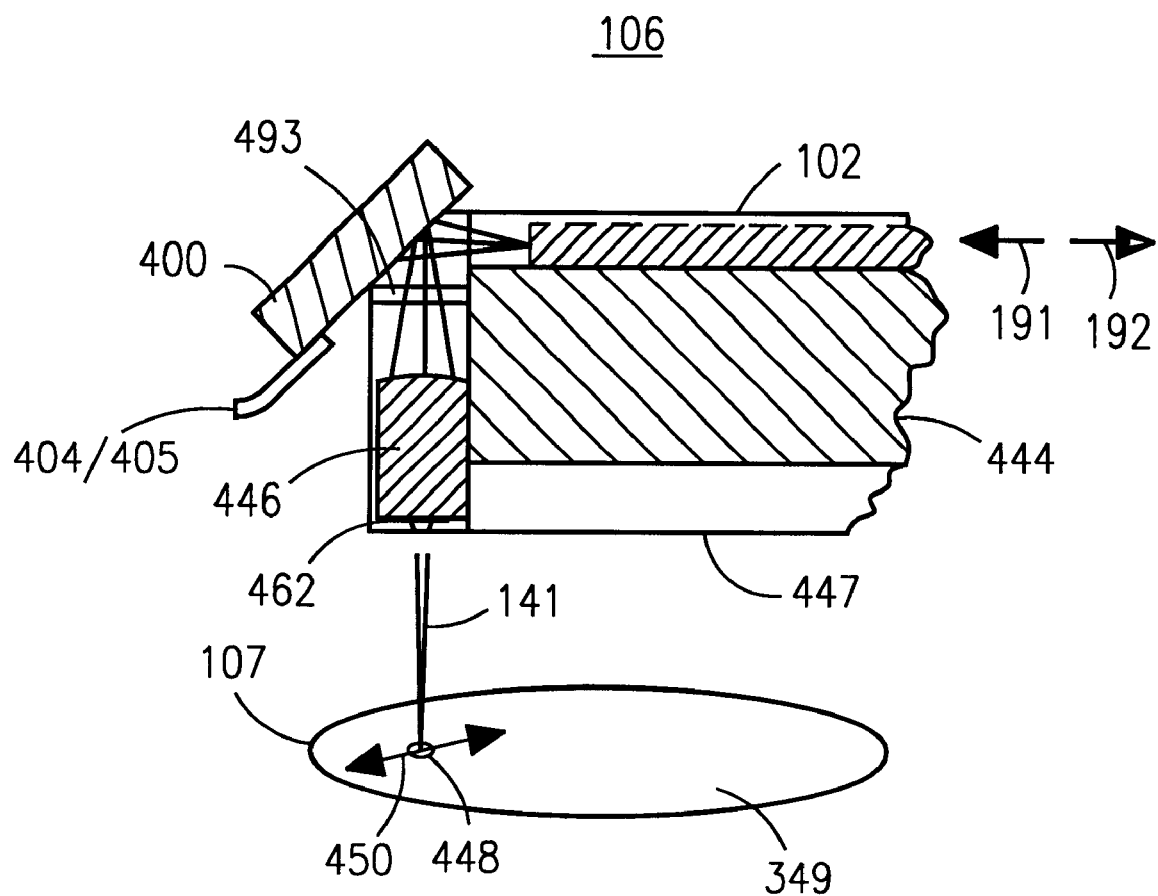
FIG. 3 is a vertical sectional view of the slider and disc of a magneto-optical disc drive in which the present invention is useful.

FIG. 3 is a vertical sectional view of the basic elements of a flying magneto-optical head of an MO data storage system, the head being of a type generally speaking which would be supported by the slider of this invention. The flying head 106 is shown for use above a recording storage layer 349 of one MO disc 107. The MO head 106 includes in part a slider body 444 having an air bearing surface 447; a quarter waveplate 493, a reflective substrate 400 and objective optics 446 which are used to focus the light beam on the surface of the disc; and a magnetic coil 460 and a yoke 462 which are used to establish the magnetic field which is necessary for accessing data on the disc surface. The slider body 444 is dimensioned to establish the working distance between the objective optics, the optical fiber 102 and the reflective substrate 400. The reflective substrate 400 may also include a reflective surface which is aligned by electrodes 404, 405 to direct the outgoing laser beams 191 to and from the storage layer 349. It is apparent from a review of this figure that the slider and associated read/write elements are capable of accessing very closely spaced tracks; therefore, accurate disposition of servo information on the disc is essential.

During operation of the drive the actuator positions the heads at select tracks on the surface of the disc with positioning of the heads being controlled by actuator control circuitry. As the disc media passes under the head the encoded signals can be read from or written to the tracks. Stored data can be extracted from the signals, processed, and sent to a host computer over an external interface. Such interfaces may be an SCSI (Small Computer Systems Interface), and EIDE (Enhanced Integrated Device Electronics) interface, or a fiber channel interface to host computer. In the description that follows, apparatus and methods to create and store magneto-optical information on the disc surfaces after completion of fabrication of the device are disclosed. For example purposes, the apparatus and methods are discussed with respect to the creation of servo pattern information on disc surfaces. It should be understood that the disclosed invention may be used to create and store other forms of magnet information on disc surfaces.

In the description that follows, apparatus and methods are to create and store magneto-optical information on disc surfaces are disclosed. For example purposes, the apparatus and methods are discussed with respect to the creation of servo pattern information on disc surfaces, as it is believed that this format is especially useful. However, the disclosed invention may be used to create and store other forms of magnetic information on disc surfaces.

To maintain head-to-track alignment, servo pattern signals are stored on the discs. These servo signals are read by the heads, detected by circuitry, and processed by control circuitry to determine and maintain head positioning accuracy. If the circuitry determines that the heads are improperly positioned, the recorded servo data provides sufficient information to send position correction commands to the actuator control. Additionally, servo pattern signals can be used by control circuitry to determine disc and rotation speed. In such implementations, the control circuitry can send speed control commands to appropriate circuitry to adjust disc rotation speed.

Servo pattern signals are written to one or more surfaces of the disc typically prior to the final assembly of the drive. The drive will use either embedded servo patterns or indirect servo patterns to enable head alignment. In an embedded pattern drive, several patterns and stored data are co-located on each disc surface. In such systems, typically the disc tracks are divided into multiple sectors with each sector including a servo pattern followed by a data storage area. Servo information written prior to assembly do not change during operation of the completed drive while the sectors' data area may be dynamically altered. Alternatively, the drive may use an indirect servo pattern system. In an indirect servo pattern system, servo patterns are stored on disc servo surfaces while data originating from a host computer is stored on separate data surfaces. Typically, data surfaces and the servo surface include an equal number and arrangement of tracks. Thus, in an assembled drive, tracks on the servo surface and tracks on the data surface will be organized into cylinders, each comprising a servo track and a number of data tracks that are substantially axially aligned with the servo track. Thus, alignment of disc heads and the data tracks can be affected by aligning the servo track in same cylinder and subsequently maintaining alignment with the servo track.

To create servo patterns in either an embedded pattern disc system or an indirect pattern system a servo patterning device is used. In conventional patterning devices, servo patterns are written to a disc surface on a bit by bit basis as the disc is rotated beneath the patterning head. Alternatively, on a plastic substrate, the pits may be formed by an injection molding process with the aid of a master plate.

Figure 4:
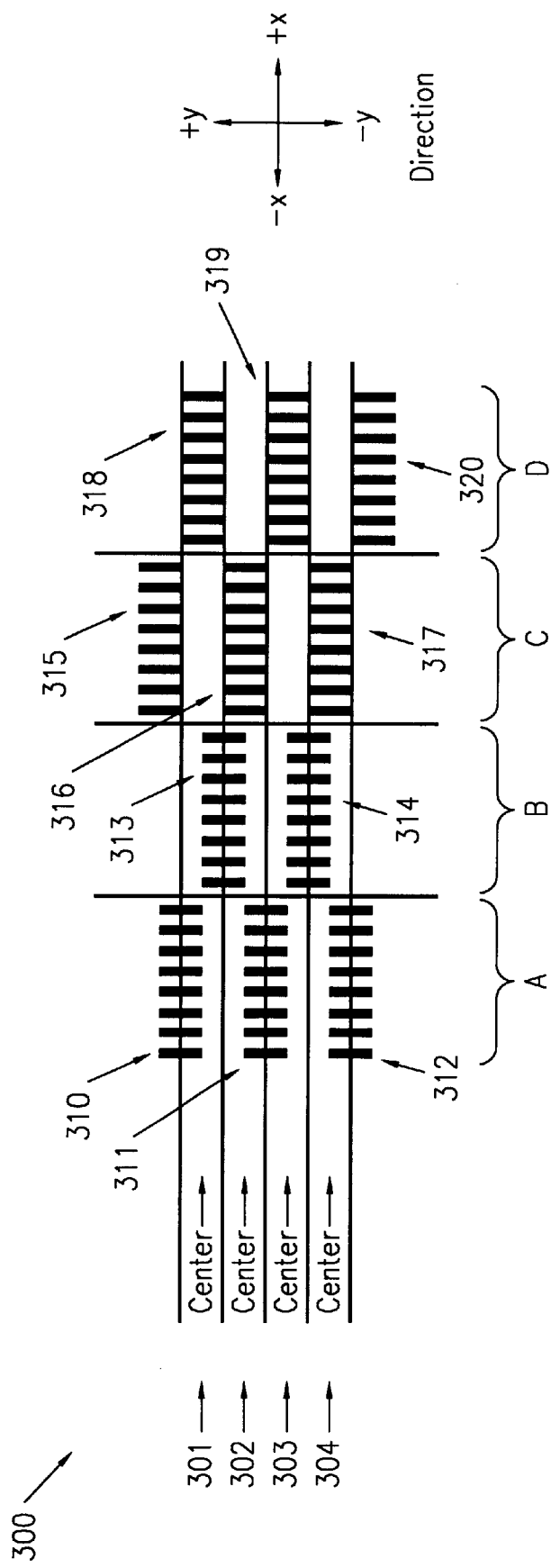
FIG. 4 is a diagram of an exemplary servo pattern.

Referring to FIG. 4, exemplary servo pattern markings 300 are shown. The servo patterns 300 consist of groups 310–320 of dibits in regions 'A', 'B', 'C', and 'D' of tracks 301–304. Each dibits is a pair of magnetic transitions that can be read by a disc head. As a disc head passes over the dibits in groups 310–320, the detected signal strength will be affected by the overlap between the disc head and the dibit group. For example, if the head is properly centered as it moves along track 301, it will encounter dibit group 310 in region 'A', group 313 in region 'B', no dibits in region 'C', and group 318 in region 'D'. As shown in FIG. 3, groups 310 and 313 partially overlap track 301 while group 318 is centered on track 301. Thus, a fully centered head will detect a lower signal strength as it passes over groups 310 and 313 compared to the signal strength as the head passes over group 318. Based on the dibit group signal strength detected in regions 'A', 'B', 'C', and 'D', the position of the drive head is determined. To do so, the following formulas may be used:

$$PES_1 = \frac{A-B}{A+B}$$

$$PES_2 = \frac{C-D}{C+D}$$

In formulas $PES_1$ and $PES_2$, dibits signal strength detected in regions 'A', 'B', 'C', and 'D' is represented by the variables A, B, C, D, respectively. Head alignment and direction may then be determined by comparing $PES_1$ and $PES_2$. If the value of PES1 is zero, the disc head is aligned along a track center. If the values of $PES_1$ and $PES_2$ have differing signs, then the head is displaced in the +y direction and should be moved in the -y direction to compensate. Additionally, the magnitudes of $PES_1$ and or $PES_2$ may be used to determine the degree of head misalignment and, correspondingly, the head motion required to compensate. Additional information may also be derived from the dibit signals 310–320.

The above, of course, is just an exemplary pattern and this invention is not limited in any way to this and any other particular pattern. According to the present invention, given a standard magneto optical disc which has been fully fabricated, a soft pattern is defined according to this invention without the use of tips or the like on any surface of the disc. The special benefit of this invention is to put down a soft pattern after the MO film is in place on the disc.

In brief, the present invention is implemented on a planar, rigid MO film on a disc by imaging the data from a servo mask using a light source which provides the necessary energy pulse input to heat up the MO film above its compensation temperature. The light is directed through a mask which has the servo pattern on it. The servo pattern is recorded on the disc by applying an external field by means of a magnetic coil or the like located closely adjacent the disc and typically on the opposite side of the disc. Of course, the field could be applied from the same side of the disc.

The servo information can be recorded on the disc either as a one-shot exposure process in which the servo mask and the light source are of sufficient size to simultaneously image the entire surface of the disc; or alternatively, regions of the disc media can be exposed one at a time, with the media rotated past the light source and the magnetic field source by a motor. For this case, a control system would be provided such that each portion or region of the media is exposed to the light source and mask while the magnetic field is applied for a time period greater than the magnetic switching time of the magnetic media. The magnetic disc could be rotated in a continuous fashion while being exposed to the light source and field; or alternatively, the disc may be rotated in discrete steps into all portions of the media to be conditioned or exposed to the field. Typically, the magnetic switching field would not be applied until after the region of the media is heated above its compensation temperature.

Figure 5:
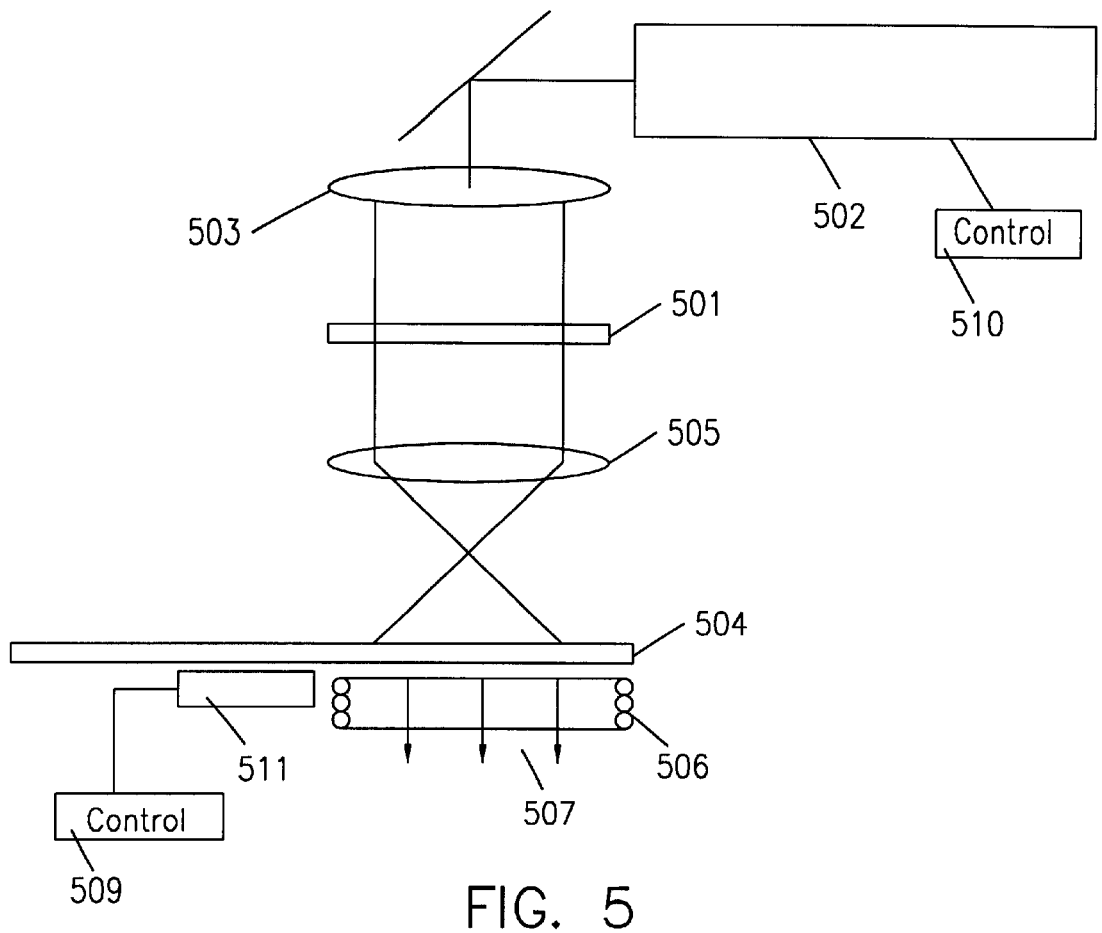
FIG. 5 is a schematic view of the apparatus used to implement the servo patterning of the present invention.

Thus, for example, referring to FIG. 5, a mask 501 bearing the servo pattern which is to be printed on the surface of MO disc 504 is shown supported between two lenses 503,505. To transfer the pattern from the mask 501 onto the disc surface 504, the control system 509 which drives motor drive 11 to align the mask 501 and the disc 504 so that the servo information represented on the surface of the mask is projected onto the appropriate area of the disc 504. The light control system 510 activates the light source 502 to optically project light through the lens 503, the mask 501, and the lens 505 to image the pattern on the mask 501 onto the disc surface 504. The lens 503 is to homogenize the light distribution over the mask. The light energy passing through the mask 501 and projected onto the disc surface will cause the illuminated region of the disc 504 to rise to an elevated temperature above its compensation temperature where information is stored in the disc. The temperature is, of course, regulated by the type of light source 502 used, the duration of the media exposure and the power output of the light source 502 as controlled by the control 510. A magnetic field 507 is applied to the disc surface by the electromagnetic coil 506. Thus, the disc surface area is raised to the elevated temperature and exposed to the patterning field 507 will form and store data relative to the surrounding unaffected disc surface. Using this technique, servo patterns such as those shown on FIG. 4 will be transferred to the disc surface.

After the pattern is formed on the exposed area of the disc 504, the control system 509 can reposition the media to transfer formatting in servo information to other areas of the disc surface. If desired, the mask may also be repositioned to, for example, alter the mask image projected onto the disc surface.

In a further alternative, where a mask 501 and coil or electromagnet 506 of suitable size are available, the entire disc surface 504 may be simultaneously imaged and exposed.

Figure 6:
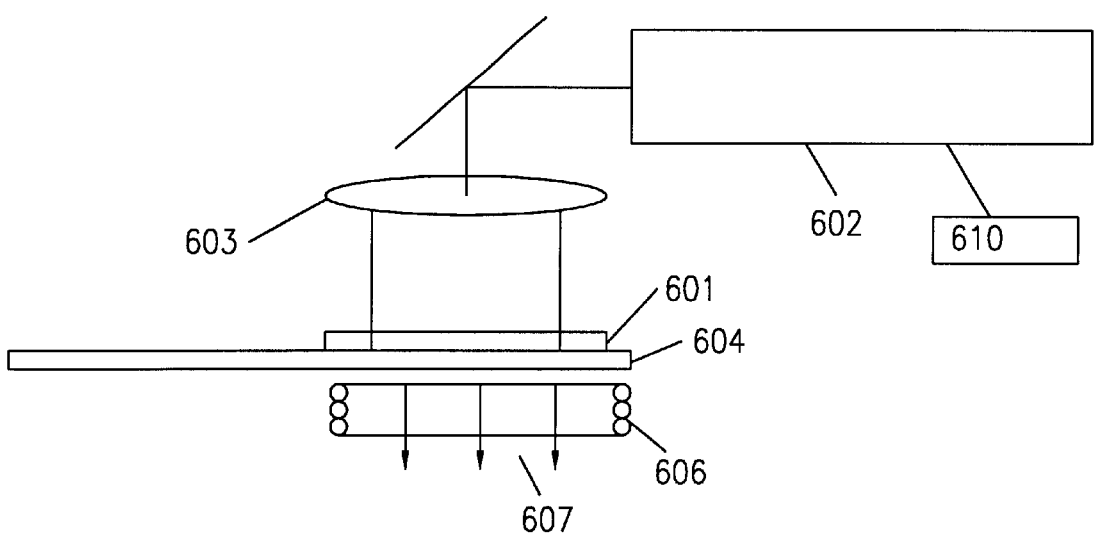
FIG. 6 is a schematic diagram of another embodiment of apparatus used to implement the method of the present invention.

In an alternative approach, a contact printing arrangement such as shown in FIG. 6 can be used. In this arrangement, the light source 602 controlled by control system 610 is imaged through a lens 603 and a mask 601 which is in contact with one surface of the disc 604 is used to project the servo pattern onto a surface of the disc. A servo patterning field 607 is applied by electromagnet 606 with the electromagnet typically although not necessarily arranged on the opposite side of the disc. This allows the image pattern to be transferred to the magneto optical disc without any optical projection system as shown in FIG. 5.

In another implementation, which takes advantage of the scanning mirror 708 (see FIG. 7) which is incorporated in the magneto optical system described above, the light source is scanned across the contact mass 701 which is provided in contact with the disc surface 704. Again, the light source 702 is controlled by control system 710 to direct the light beam off the mirror and through the mask 701 while the magnetic field 707 is provided by electromagnet 706. In this embodiment, the light source, which has in all other embodiments, is preferably an incoherent source, is of reduced size because it can be efficiently and accurately scanned radially over the disc surface through the mask 701. Again, the regions subjected to a magnetic field 707 enabled by the coil 706 accurately store the magneto optical servo information.

Figure 7:
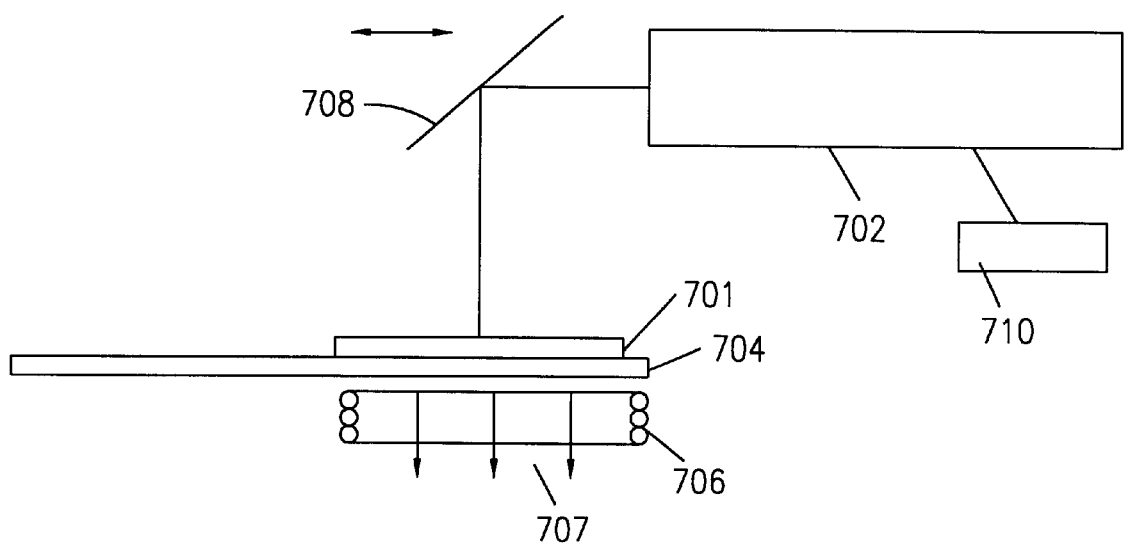
FIG. 7 is a schematic view of apparatus used to implement another embodiment of the present invention.

In a further alternative, both media and mask could be simultaneously rotated during the patterning process, especially in the scanning image transfer apparatus and process shown in FIG. 7. Other features and advantages of this invention may occur to a person of skill.in the art who studies this disclosure. Therefore, the scope of the invention is to be limited only by the following claims.

What is claimed is:

1. A magnetic field patterning system for recording servo data on a magneto-optical film on a disc comprising a magnetic field source assembly for exposing at least a region of a magneto-optic disc to a magnetic field;
   a mask aligned with said region comprising a pattern representing servo information;
   a light source aligned with said mask for exposing said disc to said pattern on said mask and for heating said region of said disc above its compensation temperature so that the image on said mask is transferred to said disc when the magnetic field is applied to the exposed region; said magnetic field source assembly establishing said magnetic field in said region of said disc for a time period greater than a magnetic switching time of the magneto-optical film while said light source heats said disc region above the compensation temperature.

2. A system as claimed in claim 1 including projection optics aligned with said mask for projecting a light pattern established by said light source shining through said mask onto said region of said disc.

3. A system as claimed in claim 2 wherein said projection optics and said light source and said mask are located on one side of said disc, and said magnetic field assembly is located on an opposite side of said mask from said one side.

4. A system as claimed in claim 1 further including means for rotating said disc about a central axis, consecutive regions of said disk being rotated between said light source and said magnetic field source,
   and control means for controlling said light source to expose said successive regions to said light source as successive regions are rotated beneath said mask.

5. A system as claimed in claim 1 wherein said mask is located in contact with said disc.

6. A system as claimed in claim 5 including a lens for expanding and homogenizing said light located between said light source and said mask in contact with said disc.

7. A system as claimed in claim 1 including scanning means for scanning said light source across said servo pattern mask in contact with said disc.

8. A method of forming a servo pattern on a magneto-optical disc, the method comprising elevating a region of said magneto-optical disc at least to a compensation temperature at which data can be written and stored on said magneto-optical disc, exposing said region of said disc to a magnetic field while said region of said disc is heated above said compensation temperature to store a servo field pattern represented on said mask on said magneto-optical disc moving successive regions of said disc which are circumferentially adjacent on said disc between said mask and said source of said magnetic field, and thereafter heating said disc above said compensation temperature, and while said disc temperature above said compensation temperature is established exposing said disc region to said magnetic field, the magnetic field exposure being for a time period greater than the a magnetic switching time of the magneto-optical film.

9. A method as claimed in claim 8 including projecting said light through a lens for homogenizing said light and smoothly distributing said light over said mask and onto said disc.

10. A method as claimed in claim 8 including projecting said light through said mask and through an optical projection lens onto a region of said surface of said disc.

11. A method as claimed in claim 8 including projecting said light through said projecting optics and through said mask, said mask being located on said surface of said disc.

12. A method as claimed in claim 11 including locating a source for said magnetic field on an opposite side of said disc from said mask, and creating said magnetic field only after said light source has heated said disc to a temperature above said compensation temperature.

13. A method as claimed in claim 8 further comprising the step of scanning said light source across said mask onto said disc.

14. A method as claimed in claim 13 wherein said mask is located in contact with said surface of said disc.

* * * * *